US006262431B1

(12) United States Patent
Scherzer et al.

(10) Patent No.: US 6,262,431 B1
(45) Date of Patent: Jul. 17, 2001

(54) INFRARED SPHEROIDAL RADIATION EMITTER

(75) Inventors: Joachim Scherzer, Bruchkoebel; Udo Hennecke, Alzenau, both of (DE)

(73) Assignee: Heraeus Noblelight GmbH, Hanau (DE)

( * ) Notice: Subject to any disclaimer, the term of this patent is extended or adjusted under 35 U.S.C. 154(b) by 0 days.

(21) Appl. No.: 09/331,195

(22) PCT Filed: Oct. 27, 1998

(86) PCT No.: PCT/EP98/06796

§ 371 Date: Aug. 18, 1999

§ 102(e) Date: Aug. 18, 1999

(87) PCT Pub. No.: WO99/22551

PCT Pub. Date: May 6, 1999

(30) Foreign Application Priority Data

Oct. 27, 1997 (DE) .............................................. 197 47 422

(51) Int. Cl.[7] ........................................................ G01J 3/10

(52) U.S. Cl. ..................................... 250/504 R; 250/493.1

(58) Field of Search ............................ 250/504 R, 493.1, 250/494.1; 219/553

(56) References Cited

U.S. PATENT DOCUMENTS

| | | | | |
|---|---|---|---|---|
| 5,731,594 | * | 3/1998 | Kuroda et al. | 250/504 R |
| 5,838,016 | * | 11/1998 | Johnson | 250/504 R |
| 5,939,726 | * | 8/1999 | Wood | 250/504 R |

* cited by examiner

*Primary Examiner*—Kiet T. Nguyen
(74) *Attorney, Agent, or Firm*—Oblon, Spivak, McClelland, Maier & Neustadt, P.C.

(57) ABSTRACT

A spheroidally emitting infrared emitter with a sheathing bulb. A radiation source provided with an electrical connection is surrounded by the sheathing bulb. The radiation source includes a first radiation strip that is bent along its longitudinal axis in such a way that it has a top, convex, curved flat side. The device is improved with regard to its thermal inertia while achieving a high radiation output.

20 Claims, 1 Drawing Sheet

INFRARED SPHEROIDAL RADIATION EMITTER

BACKGROUND OF THE INVENTION

1. Field of the Invention

The invention relates to a spheroidally emitting infrared emitter with a sheathing bulb that surrounds a radiation source provided with electrical connections.

2. Discussion of the Background

Such infrared emitters are used for local heating, for example in medicine, for therapeutic treatment of specific points, or in areas which are difficult to access, for local heating of carrier materials made of molded plastic parts, such as interior door panels in passenger car production, as well as similar industrial applications, such as deep-drawing processes. Frequently, spherical or spheroidal emission of the infrared radiation is an aim in such applications.

In a known infrared emitter, such spheroidal emission is achieved by means of a spherical or hemispherical sheathing bulb, which is made of a ceramic material that gives off infrared radiation. The radiation source is arranged inside the sheathing bulb, and heats the latter. In industrial applications, rapid temperature changes are frequently necessary, but because of the thermal inertia of the sheathing bulb, they cannot be achieved using the known infrared emitter. Furthermore, the known infrared emitter is only suitable for low output density.

SUMMARY OF THE INVENTION

The invention is therefore based on the task of indicating a spheroidally emitting infrared emitter which demonstrates low thermal inertia and which can be used to achieve high radiation output.

This task is accomplished according to the invention, starting from the infrared emitter described initially, in that the radiation source comprises a first radiation strip that is bent along its lengthwise axis in such a way that it has a top, convex, curved flat side.

In the infrared emitter according to the invention, spheroidal emission is achieved in that the radiation source itself has an approximately spheroid shape. For this purpose, the radiation source, in its simplest form, comprises a first, bent radiation strip. The radiation strip emits radiation primarily in the direction of its flat sides. The top flat side is curved in convex shape, forming a segment of the curved surface of a spherical segment or a spheroid segment. The bend can be structured, for example, in the shape of a "U," a circular segment, or in the form of a simple spiral, similar to a looping shape. It is essential that spheroid emission to the outside is achieved by the curvature of the top flat side, at least as a first approximation. The radiation strip can also be twisted around its lengthwise axis, in addition to the convex curvature. The peak of the curvature generally lies in the region of the lengthwise axis of the infrared emitter.

In an ideal case, spheroid emission has the shape of a rotation ellipsoid or a part of such a rotation ellipsoid. Here, spherical emission in the form of emission which has the shape of a spherical segment in an ideal case, for example hemispherical emission, is understood to be a special case of spheroidal emission. For the sake of simplicity, in the following only spheroidal emission or a spheroidal shape of the radiation strip will be discussed, where this is understood to include hemispheroidal, spherical or hemispherical emission and/or radiation strip shapes.

In many applications, slight deviations from the stated ideal shapes are acceptable; it is sufficient if at east partially spheroid emission is obtained. Such emission that deviates from the ideal case is also the object of the present invention.

Because the radiation source comprises a radiation strip that has a relatively small mass, because of its geometry, rapid temperature changes are made possible. The lower the specific heat capacity of the radiation strip material and the thinner the radiation strip, the faster the temperature changes that are possible. Typical materials for the radiation strip are metal, carbon, or conductive ceramics.

The curvature of the radiation strip also contributes to a high temperature change strength of the radiation source. This is because length changes due to thermal expansion or contraction can be easily compensated by the curvature. This allows operation of the radiation element at high output density.

An embodiment of the infrared emitter in which the first radiation strip runs in a first curvature plane, and has a peak point in the region of the lengthwise axis of the infrared emitter, has particularly proven itself. By having a peak point of the curvature in the region of the lengthwise axis of the infrared emitter, the symmetry of the emitter, and that of the sheathing bulb, are brought into agreement with that of the radiation strip. The first curvature plane is defined by the center axes of the two free shanks of the bent radiation strip.

In this connection, sufficient approximation to spheroid emission is achieved in particularly simple manner, in that the first radiation strip is bent in U shape or semicircular shape in the first curvature plane. Here, a U-shaped bend is also understood to be a bend which is horseshoe-shaped in cross-section.

A radiation strip made of a carbon strip has particularly proven itself. The carbon strip is usually formed by a plurality of carbon fibers that run parallel to one another. It is characterized by low heat capacity, so that particularly rapid temperature changes are possible using such a strip. In addition, the carbon strip is characterized by a high specific emission coefficient for infrared radiation, so that high radiation energies can be achieved with a radiation strip structured in this way, even at relatively low mean color temperatures. The mean color temperatures of the carbon strip are in the range between 1100° C. and 1200° C. under normal operating conditions. The full radiation output is generally available within a few seconds after the emitter has been turned on. For the infrared emitter according to the invention, this time span is typically only 1 to 2 seconds.

Particularly with regard to rapid temperature changes, a radiation strip in the form of a carbon strip with a thickness in the range of 0.1 mm to 0.2 mm, and with a width in the range of 5 mm to 8 mm, has proven to be advantageous.

It is advantageous if the two free ends of the first radiation strip are held in or on a carrier element made of electrically insulating material. This guarantees good shape stability of the radiation strip. It can therefore be made very thin. The ends of the radiation strip can be attached to the carrier element directly or via intermediate elements. At the same time, the carrier element can serve to attach the electrical connectors and for electrically connecting them with the radiation strip.

In this regard, a carrier element that comprises a ceramic disk provided with a groove to hold a pinch for passing the electrical connections through under a vacuum seal, and with passage bores for the electrical connections, has particularly proven itself.

Another approximation to ideal spheroid emission is achieved by an embodiment of the infrared emitter according to the invention in which the radiation source comprises a second radiation strip, which is bent along its lengthwise axis in such a way that it has a top, convex, curved flat side, where the second radiation strip runs in a second curvature plane, and has a peak point in the region of the lengthwise axis of the infrared emitter, which is at a distance from the peak point of the first radiation strip. The advantages of the holder arrangement and the curvature of the radiation strip with regard to its temperature change strength and the accompanying "thermal rapidity" were already explained above. The second radiation strip allows operation of the infrared emitter at a particularly high output density. Furthermore, the spherical geometry of emission is improved, since the two radiation strips can each produce different segments of the desired spherical or spheroid emission, if the individual curvature planes intersect. The first and the second radiation strip can be structured in identical manner, except for their length.

For this reason, it is advantageous if the curvature planes stand perpendicular to one another, where the peak points of the radiation strips lie on top of one another, seen in the direction of the lengthwise axis of the infrared emitter. This results in a particularly good approximation to rotation-symmetrical, spherical emission.

In an embodiment of the infrared emitter according to the invention, in which the first and the second radiation strip are switched in series, the radiation strips can be switched separately from one another, adapting them to the required output density.

The sheathing bulb of the infrared emitter according to the invention is permeable for infrared radiation; it is advantageous for the bulb to be made of quartz glass. A long useful lifetime of the radiation strip and high output density are achieved in that the sheathing bulb is evacuated or filled with a rare gas.

Temperatures in the range between 1100° C. and 1200° C. can be achieved with their emitter according to the invention.

BRIEF DESCRIPTION OF THE DRAWINGS

In the following, the invention will be explained in greater detail on the basis of an exemplary embodiment and a patent drawing. The single FIGURE of the patent drawing shows a three-dimensional representation of a medium-wave carbon emitter with hemispheroidal emission.

DETAILED DESCRIPTION OF THE PREFERRED EMBODIMENT

Figure 1:
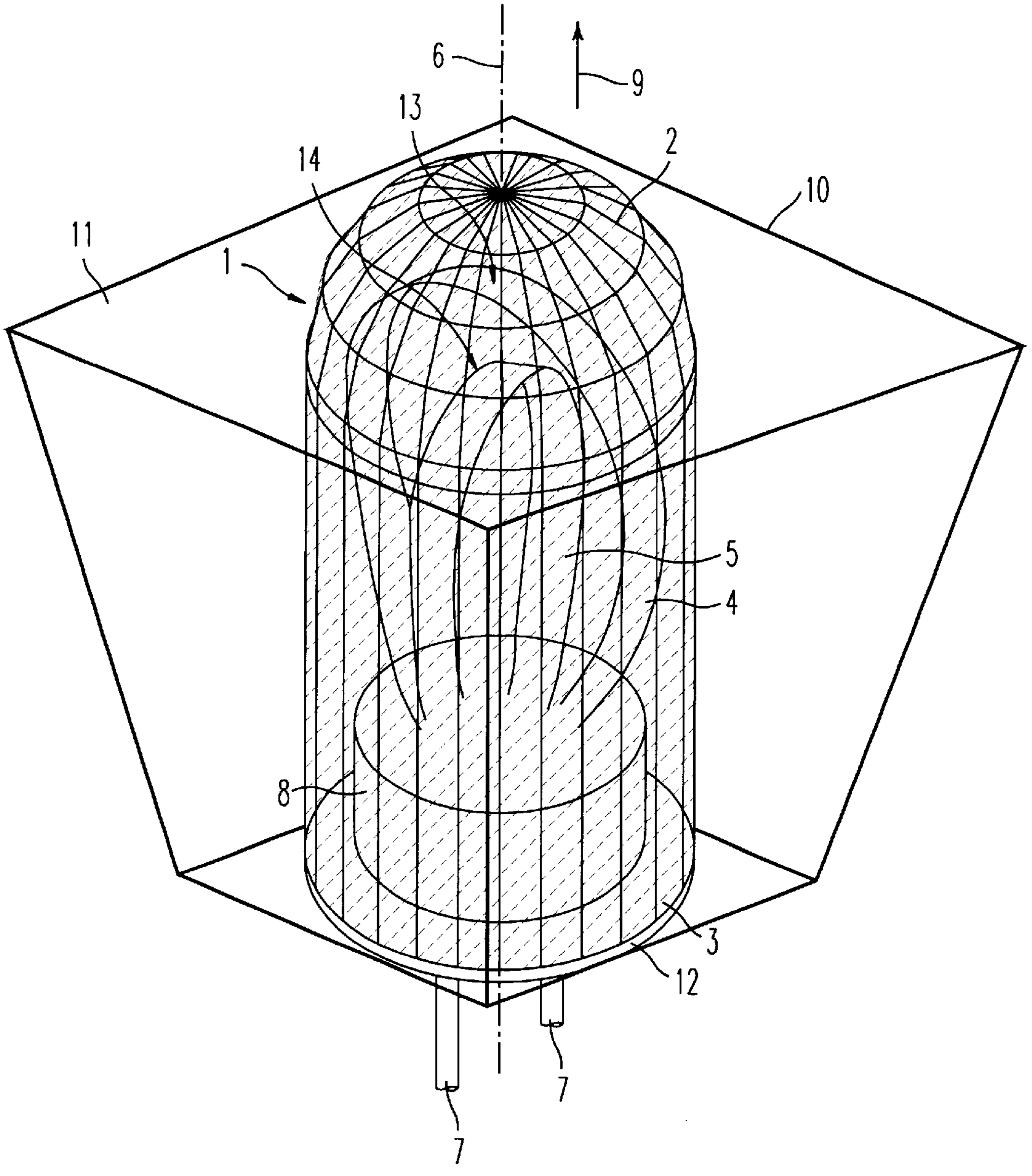

The carbon emitter in FIG. 1 is indicated, as a whole, with the reference number 1. The carbon emitter 1 has a bulb 2 of quartz glass, which comprises a disk-shaped, ceramic carrier 3. Inside the bulb 2, there are furthermore a first carbon strip 4, which is bent along its lengthwise axis in horseshoe shape, and a second, shorter carbon strip 5, which is also bent in horseshoe shape. The top flat sides of the carbon strips 4, 5 are bent in convex shape, seen in the direction of the lengthwise axis 6 of the bulb 2. The curvature planes in which the bends of the carbon strips 4, 5 run are perpendicular to one another, and the peak points 13; 14 of the carbon strips 4, 5, respectively, lie on top of one another, seen in the direction of the lengthwise axis 6 of the bulb 2. The carbon strips 4, 5 are at such a distance from one another, at all points, that mutual contact is precluded. Because of their arrangement relative to one another, the bent carbon strips 4, 5 approximately form a hemisphere or hemispheroid.

The carrier 3 is provided with a total of four slits (not specifically shown in the drawing), in which the free ends of the carbon strips 4, 5 are fixed in place, in each instance. This guarantees the stability of their geometrical shape, arrangement and electrical contacts within the carrier 3, and therefore also the stability of the infrared emission.

The carbon strips 4, 5 each have a thickness of 0.15 mm and a width of 7 mm. Because of their arrangement and curvature, the carbon strips 4, 5 emit infrared radiation to the outside in approximately hemispherical shape, when the carbon emitter 1 is in operation.

The strips 4, 5 are electrically switched in series. This is provided by appropriate contacts in the carrier 3. The electrical connections 7 for the carbon strips 4, 5 are brought out of the bulb 2 via a pinch 8, forming a vacuum seal. With its end that faces away from the bulb 2, the pinch 8 is structured as a quartz glass foot 12 which points to the outside and is fastened on the bottom, in that the bulb 2 is melted together with it.

Electrical energy is supplied via the electrical connections 7, which are structured as plug-in contacts. In the exemplary embodiment, the bulb 2 is evacuated. As an alternative, it is filled with rare gas.

In order to guarantee the most complete emission to the front that is possible, in the direction of the arrow 9, the carbon emitter 1 is surrounded by a reflector 10, which has a square opening 11. In FIG. 1, the reflector 10 is shown only in perspective.

Using the infrared emitter according to the invention, approximately hemispherical emission is achieved. The carbon strips guarantee high thermal rapidity at a high output of approximately 240 W to 250 W. In the embodiment described, the full radiation output is available within 1 to 2 seconds. Its mean color temperature is between 1100° C. and 1200° C. At the same time, the infrared emitter according to the invention can be produced with low construction heights and small geometrical dimensions.

Using the carbon emitter according to the invention, heating outputs can be produced very precisely in terms of location and time. This allows use as a temperature-variable surface emitter, where a plurality of the infrared emitters according to the invention are arranged in a grid and can be controlled independently of one another. Using such an arrangement, different areas of geometrically complex molded parts can be individually heated, for example. This is particularly useful for uniform or gentle heating of regions of molded plastic parts that are difficult to access.

What is claimed is:

1. Spheroidally emitting infrared emitter with a sheathing bulb that surrounds a radiation source provided with electrical connections, characterized in that the radiation source comprises a first radiation strip that is bent along its lengthwise axis in such a way that it has a top, convex, curved flat side.

2. Infrared emitter according to claim 1, characterized in that the first radiation strip runs in a first curvature plane, and has a peak point in the region of the lengthwise axis of the infrared emitter.

3. Infrared emitter according to claim 2, characterized in that the radiation source comprises a second radiation strip, which is bent along its lengthwise axis in such a way that it has a top, convex, curved flat side, where the second radiation strip runs in a second curvature plane, and has a peak point in the region of the lengthwise axis of the infrared emitter, which is at a distance from the peak point of the first radiation strip.

4. Infrared emitter according to claim 3, characterized in that the first and the second curvature planes stand perpendicular to one another, and that the peak points of the radiation strips lie on top of one another, seen in the direction of the lengthwise axis of the infrared emitter.

5. Infrared emitter according to claim 3, characterized in that the first and the second radiation strip are switched electrically in series.

6. Infrared emitter according to claim 2, characterized in that the first radiation strip (4) is bent in U shape or semicircular shape.

7. Infrared emitter according to claim 6, characterized in that the first radiation strip is structured as a carbon strip.

8. Infrared emitter according to claim 2, characterized in that the first radiation strip is structured as a carbon strip.

9. Infrared emitted according to claim 2, characterized in that the two free ends of the first radiation strip are held in or on a carrier element made of electrically insulating material.

10. Infrared emitter according to claim 1, characterized in that the first radiation strip is bent in U shape or semicircular shape.

11. Infrared emitted according to claim 10, characterized in that the two free ends of the first radiation strip are held in or on a carrier element made of electrically insulating material.

12. Infrared emitter according to claim 1, characterized in that the first radiation strip is structured as a carbon strip.

13. Infrared emitter according to claim 12, characterized in that the carbon strip has a thickness in the range of 0.1 mm to 0.2 mm.

14. Infrared emitter according to claim 13, characterized in that the carbon strip has a width in the range of 5 mm to 8 mm.

15. Infrared emitted according to claim 13, characterized in that the two free ends of the first radiation strip are held in or on a carrier element made of electrically insulating material.

16. Infrared emitted according to claim 12, characterized in that the two free ends of the first radiation strip are held in or on a carrier element made of electrically insulating material.

17. Infrared emitter according to claim 1, characterized in that the two free ends of the first radiation strip are held in or on a carrier element made of electrically insulating material.

18. Infrared emitter according to claim 7, characterized in that the carrier element comprises a ceramic disk provided with a groove to hold a pinch for passing the electrical connections through under a vacuum seal, and with passage bores for the electrical connections.

19. Infrared emitter according to claim 1, characterized in that the sheathing bulb is evacuated or filled with a rare gas.

20. Infrared emitter according to claim 1, characterized in that the radiation source produces a color temperature in the range between 1100° C. and 1200° C.

* * * * *